(12) United States Patent
McArdle et al.

(10) Patent No.: US 11,010,495 B1
(45) Date of Patent: May 18, 2021

(54) SYSTEMS AND METHODS FOR RUNTIME ENFORCEMENT OF DATA FLOW INTEGRITY

(71) Applicant: ARCHITECTURE TECHNOLOGY CORPORATION, Eden Prairie, MN (US)

(72) Inventors: Daniel McArdle, Ithaca, NY (US); Judson Powers, Ithaca, NY (US)

(73) Assignee: Architecture Technology Corporation, Eden Prairie, MN (US)

( * ) Notice: Subject to any disclaimer, the term of this patent is extended or adjusted under 35 U.S.C. 154(b) by 238 days.

(21) Appl. No.: 16/168,760

(22) Filed: Oct. 23, 2018

(51) Int. Cl.
*G06F 21/52* (2013.01)
*G06F 21/64* (2013.01)
*G06F 9/445* (2018.01)
*G06F 8/52* (2018.01)
*G06F 9/30* (2018.01)

(52) U.S. Cl.
CPC .............. *G06F 21/64* (2013.01); *G06F 8/52* (2013.01); *G06F 9/3017* (2013.01); *G06F 9/44589* (2013.01); *G06F 21/52* (2013.01)

(58) Field of Classification Search
CPC ................................................ G06F 21/52–54
See application file for complete search history.

(56) References Cited

U.S. PATENT DOCUMENTS

| | | | | |
|---|---|---|---|---|
| 2013/0283245 | A1* | 10/2013 | Black | G06F 9/44589 717/130 |
| 2014/0380283 | A1* | 12/2014 | Hu | G06F 8/20 717/132 |
| 2015/0227746 | A1* | 8/2015 | Chen | G06F 21/54 726/25 |
| 2015/0294113 | A1* | 10/2015 | Troeger | G06F 21/53 726/25 |

(Continued)

OTHER PUBLICATIONS

Castro et al. Securing software by enforcing data-flow integrity OSDI '06: 7th USENIX Symposium on Operating Systems Design and Implementation pp. 147-160 (Year: 2006).*

(Continued)

*Primary Examiner* — David J Pearson
(74) *Attorney, Agent, or Firm* — Foley & Lardner LLP

(57) ABSTRACT

Disclosed herein are embodiments of systems, methods, and products comprise a processor, which provides runtime enforcement of data flow integrity. The processor accesses the application binary file from the disk to execute an application and translates the application binary into intermediate representation. The processor applies the logic of data flow integrity controls to the intermediate representation. Specifically, the processor identifies the vulnerable code in the intermediate representation. The processor applies data flow integrity controls to the vulnerable code. The processor adds simple instrumentation that only changes the application's behavior when unauthorized data tampering occurs while preserving the application's normal (Continued)

behavior. When certain operations may cause unauthorized data tampering, the processor takes proper measures to stop the operations. The processor translates the intermediate representation back to a machine code and replaces the original binary with the machine code.

20 Claims, 5 Drawing Sheets

(56) References Cited

U.S. PATENT DOCUMENTS

| | | | |
|---|---|---|---|
| 2016/0026791 A1* | 1/2016 | Melski | G06F 21/54 726/25 |
| 2017/0116410 A1* | 4/2017 | Wajs | G06F 8/70 |
| 2019/0042760 A1* | 2/2019 | Gutson | G06F 21/577 |
| 2020/0125475 A1* | 4/2020 | Iyer | G06F 8/75 |

OTHER PUBLICATIONS

Author: Daniel McArdle, Title: Flowgate: Runtime Enforcement of Data Flow Integrity, Topic No. and Name: SB173-003 Mitigating Data-Oriented Application Exploits via Application Data Sandboxing, Architecture Technology Corporation, submitted as a proposal on Oct. 25, 2017, 24 pages.

\* cited by examiner

```
struct message {
    char packet[10];
    int authenticated;
};

int receive(int len, char *data) {
    struct message request;
    request.authenticated = 0;
    memcpy(request.packet, data, len);  /* Vulnerable to buffer overflow */ ─402
                                        ─404
    if (checkAuth(request.packet)) {    /* Intended authentication method */
        request.authenticated = 1;
    }
    if (request.authenticated) {
        printf("AUTHENTICATED\n");
        return 1;
    } else {
        printf("ACCESS DENIED\n");
        return 0;
    }
}
```

SYSTEMS AND METHODS FOR RUNTIME ENFORCEMENT OF DATA FLOW INTEGRITY

TECHNICAL FIELD

This application relates generally to methods and systems for mitigating data-oriented application exploits. Specifically, this application relates to methods and systems for runtime enforcement of data flow integrity.

BACKGROUND

Conventional cybersecurity solutions for preventing memory corruption attacks are insufficient for the purposes of protecting confidentiality and integrity of security-relevant data. Attacks that modify or exfiltrate application data are primarily enabled by memory corruption vulnerabilities. Conventional cybersecurity techniques focus on mitigating the most common subset of these vulnerabilities, called control-data attacks, but neglect their equally-effective counterpart, non-control data attacks.

Control-data attacks alter the behavior of an application by corrupting its control data. For example, an attacker could exploit a buffer overflow to overwrite a function's return address, causing it to begin executing other code. Because control-data attacks are so common, many defensive techniques have been developed in the category of protecting Control Flow Integrity, such as Data Execution Prevention (DEP) and Address Space Layout Randomization (ASLR). Many of these defenses were developed in reaction to specific, previously-unknown attacks. As a result, they have a limited scope and fail to defend against the full spectrum of memory corruption attacks.

Conventional computer security solutions fail to prevent exfiltration of security-relevant data because they focus on control-data attacks and neglect pure data attacks. Despite the lack of attention, pure data attacks have been shown to be realistic threats, just as capable of breaching data confidentiality and violating integrity as control-data attacks.

There is a critical need to develop efficient methods for identifying and enforcing appropriate controls to security-relevant data residing within the address-space of an application. Applications are increasingly data-rich, yet the security protections available for the most popular platforms do not provide any data controls within the context of a single application. While some applications do employ proprietary ad hoc sandboxing, such technology only enforces separation of the application from the operating system, instead of separation of the data used within the application. This topic seeks ways to add data controls with generic operating system or application embedded security extensions.

The root cause of a large class of application attacks stems from memory corruption vulnerabilities. These memory errors may, for example, be caused by an application using uninitialized memory, pointers to objects that have been previously freed, or accessing a buffer of data beyond the allocated size of the data. Traditionally, these vulnerabilities have been used in attacks that seize control of an application by altering control-flow, for example, by injecting new code into the application or by leveraging existing code. Contemporary defenses seek to reduce the number of memory corruption vulnerabilities, and the widespread deployment of practical implementations of data-execution prevention (DEP) and control-flow integrity (CFI) have made code injection and code reuse attacks more difficult to pull off than they once were. Nevertheless, applications are routinely shown to be vulnerable to the loss of data security, both in terms of confidentiality and integrity, especially in light of non-control data attacks.

Hence, there is a need for a framework for application data sandboxing (or isolation, partitioning, etc.) of data-rich applications that provide data security, both in terms of confidentiality and integrity, thereby preventing or significantly limiting both the modification and disclosure of security-relevant data used by an application. The data security model should go beyond Bell-LaPadula and Biba Integrity models, which only separate high-privileged data from lower-privileged data. This requirement stems from the fact that data-oriented attacks typically involve accessing data of the same privilege-level (e.g., passwords, keys, browser cookies), but across different contexts (e.g., domains, users, processes). The framework should be transparent to the user, not interfere with normal application functionality, not require extensive manual software re-architecting, and should operate with minimal negative performance impact under normal usage of the application. The approaches taken should, for example, identify security-relevant data, partition the data into appropriately sized groupings of data and the code that may access those data groupings, then enforce the partitioning at runtime. Frameworks that correctly and efficiently operate on COTS binaries are desired.

SUMMARY

What is therefore desired are systems and methods that prevent non-control data attacks and provide data security. Embodiments disclosed herein solve the aforementioned problems and other problems by developing a framework for runtime enforcement of data flow integrity. Specifically, to prevent non-control attacks from executing an application, a processor may access the application binary file from the disk and translate the application binary into intermediate representation. The intermediate representation may be code comprising an intermediate graph structure that allows for flow analysis. The processor may apply the logic of data flow integrity controls to the intermediate representation. The processor may identify the vulnerable code in the intermediate representation. For example, the processor may identify the code for read and write instructions in the code section of the intermediate representation. The processor may apply data flow integrity controls to the vulnerable code. The processor may add simple instrumentation that only changes the application's behavior when unauthorized data tampering occurs while preserving the application's normal behavior. When certain operations may cause unauthorized data tampering, the processor may take proper measures to stop the operations. The processor may do the translation in reverse to translate the intermediate representation back to a machine code and replace the original binary with the machine code.

In one embodiment, a computer implemented method comprises accessing, by a processor, an application binary of a binary file corresponding to an application from a non-transitory storage medium; translating, by the processor, the application binary of the binary file into intermediate representation, wherein the intermediate representation comprises an intermediate graph structure for data flow analysis; applying, by the processor, data flow integrity control logic to a set of code within the intermediate representation by checking structure of data layout in memory and tracking usage of memory area for an unauthorized data tampering behavior; adding, by the processor, to the set of code an instrumentation configured to correct the unauthorized data tampering behavior; and translating, by the processor, the intermediate representation with the added instrumentation into a machine code.

In another embodiment, a system comprises a non-transitory storage medium configured to store a binary file corresponding to an application; a processor connected to the non-transitory storage medium and configured to: access application binary of the binary file from the non-transitory storage medium; translate the application binary of the binary file into intermediate representation, wherein the intermediate representation comprises an intermediate graph structure for data flow analysis; apply data flow integrity control logic to a set of code within the intermediate representation by checking structure of data layout in memory, tracking usage of memory area for unauthorized data tampering behavior; add to the set of code an instrumentation configured to correct the unauthorized data tampering behavior; and translate the intermediate representation with the added instrumentation into a machine code.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 4A illustrates an example of code vulnerable to a non-control data exploit, according to an embodiment.

DETAILED DESCRIPTION

Figure 1:
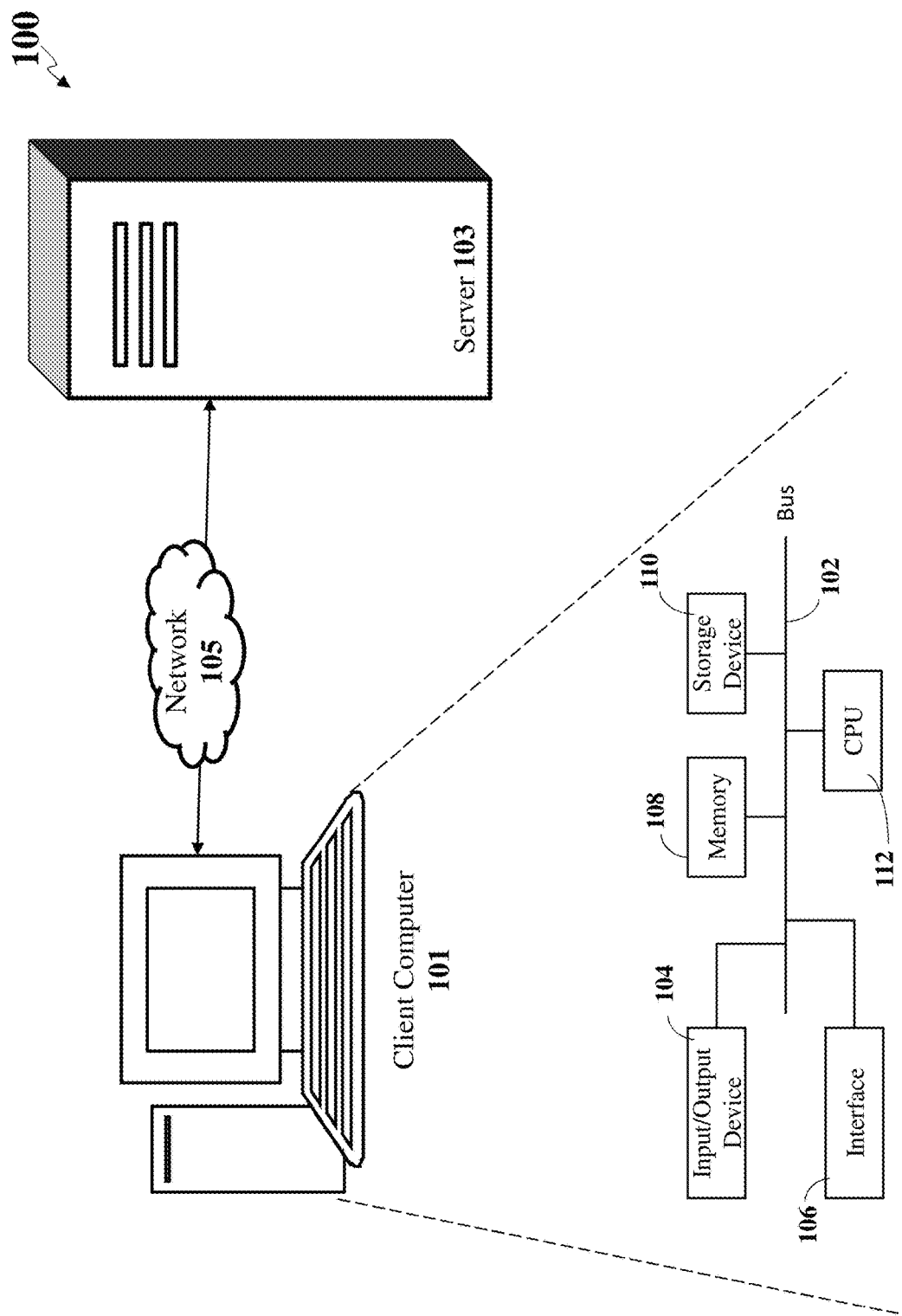
FIG. 1 illustrates a computer system for runtime enforcement of data flow integrity, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Conventional computer security solutions fail to address the need to prevent exfiltration of security-relevant data because they focus on control-data attacks and neglect pure data attacks. Embodiments disclosed herein address this need by developing a security application for runtime enforcement of data flow integrity (commercially known as Flowgate). The security application automatically instruments pre-built application binaries to enable a form of data sandboxing that prevents corrupted data from being read by the application. For example, if a malicious user attempted to exfiltrate data from the security application-protected instance of WU-FTPD, a popular FTP server that contains a pure-data memory corruption vulnerability, low-level instrumentation added to the application's machine code would detect the corrupted data before it is used for any purpose.

Embodiments disclosed herein describe a processor that builds the security application, a software tool that augments COTS (commercial off the shelf) application binaries with runtime data sandboxing for defense against the full spectrum of memory corruption attacks. The security application provides fusion of binary instrumentation, binary analysis, and data flow integrity enforcement techniques.

The security application operates on application at the binary level, dynamically instrumenting read and write instructions in the code section. One benefit of security application is its completeness: it instruments all binary machine code in a process, including system libraries and any handwritten assembly code. Besides operating on COTS application binaries without source code, the security application has another benefit: it requires no modifications to the operating system kernel and no added hypervisor. The benefits apply to both military and commercial entities storing sensitive information, including personal health information, accounting data, or trade secrets.

FIG. 1 is shows an illustrative system 100 in which one or more embodiments of the present disclosure may operate. The system 100 may comprise a client computer 101 and a server 103 connected by a network 105. The client computer 101 may be any type of computer, including but not limited to, a desktop computer, a laptop computer, a tablet computer, and a smartphone. The server 103 may be any kind of computing device executing one or more server operations. For example, the server may be a server computer, a desktop computer, a laptop computer, a tablet computer, and a smartphone. The network 105 interconnecting the client computer 101 and the server 103 may be any kind of network, including but not limited to, a local area network (LAN), a metropolitan area network (MAN), a wide area network (WAN), and the Internet. For the ease of explanation, the below description includes details of various components of the client computer 101 and their respective functionalities. However, it should be understood that the components may be located anywhere within the system 100 and the corresponding functionality may be executed anywhere in the system 100.

In one embodiment, the client computer 101 includes bus 102, input/output (I/O) device 104, communication interface 106, memory 108, storage device 110 and central processing unit or processor 112. In another embodiment, client computer 101 includes additional, fewer, different, or differently arranged components than those illustrated in FIG. 1.

Bus 102 is in physical communication with (I/O) device 104, communication interface 106, memory 108, storage device 110, and central processing unit 112. Bus 102 includes a path that permits components within client computer 101 to communicate with each other. Examples of (I/O) device 104 include peripherals and/or other mechanisms that enable a user to input information to client computer 101, including a keyboard, computer mice, buttons, touch screens, voice recognition, and biometric mechanisms, and the like. (I/O) device 104 also includes a mechanism that outputs information to the user of client computer 101, such as, for example a display, a light emitting diode (LED), a printer, a speaker, and the like.

Examples of communication interface 106 include mechanisms that enable client computer 101 to communicate with other computing devices and/or systems through the network 105. Examples of memory 108 include random access memory 108 (RAM), read-only memory (ROM), flash memory, and the like. Examples of storage device 110 include magnetic and/or optical recording medium, ferroelectric RAM (F-RAM) hard disks, solid-state drives, floppy disks, optical discs, and the like. In one embodiment, memory 108 and storage device 110 store information and instructions for execution by central processing unit 112. In another embodiment, central processing unit (also referred to as a processor) 112 includes a microprocessor, an application specific integrated circuit (ASIC), or a field programmable object array (FPOA), and the like. In this embodiment, central processing unit 112 interprets and executes instructions retrieved from memory 108 and storage device 110.

In one embodiment, the processor 112 may read a binary file corresponding to a software application from the storage device 110 via bus 102, or from another client computer 101 via communication interface 106. The processor 112 may execute the software application by executing the binary file. The execution of an application may involve different operations of data records, such as read and write operations that read and/or write data in the memory 108. Such operations may include non-control data attacks, such as memory 108 corruption. The processor 112 may enforce the data flow integrity by performing processes that will be described in FIGS. 2-4, below. Specifically, the processor 112 may first translate the application binary in the binary file into intermediate representation. The processor 112 may identify vulnerable code in the intermediate representation, such as read and write instructions that read and write data in the memory 108. For each read and/or write operation, the processor 112 may apply data flow integrity controls by checking the structure of data layout in the memory 108 and track usage of memory 108 area to identify unauthorized data tampering behavior in the memory 108. The processor 112 may add instrumentation to the intermediate representation to guarantee there is no security violation in the memory 108. The processor 112 may translate the intermediate representation into machine code, and replace the original binary with the machine code in the storage device 110. Hardwired circuitry may be used in place of or in combination with software instructions to implement processes described herein. Thus, implementations described herein are not limited to any specific combination of hardware circuitry and software.

Figure 2:
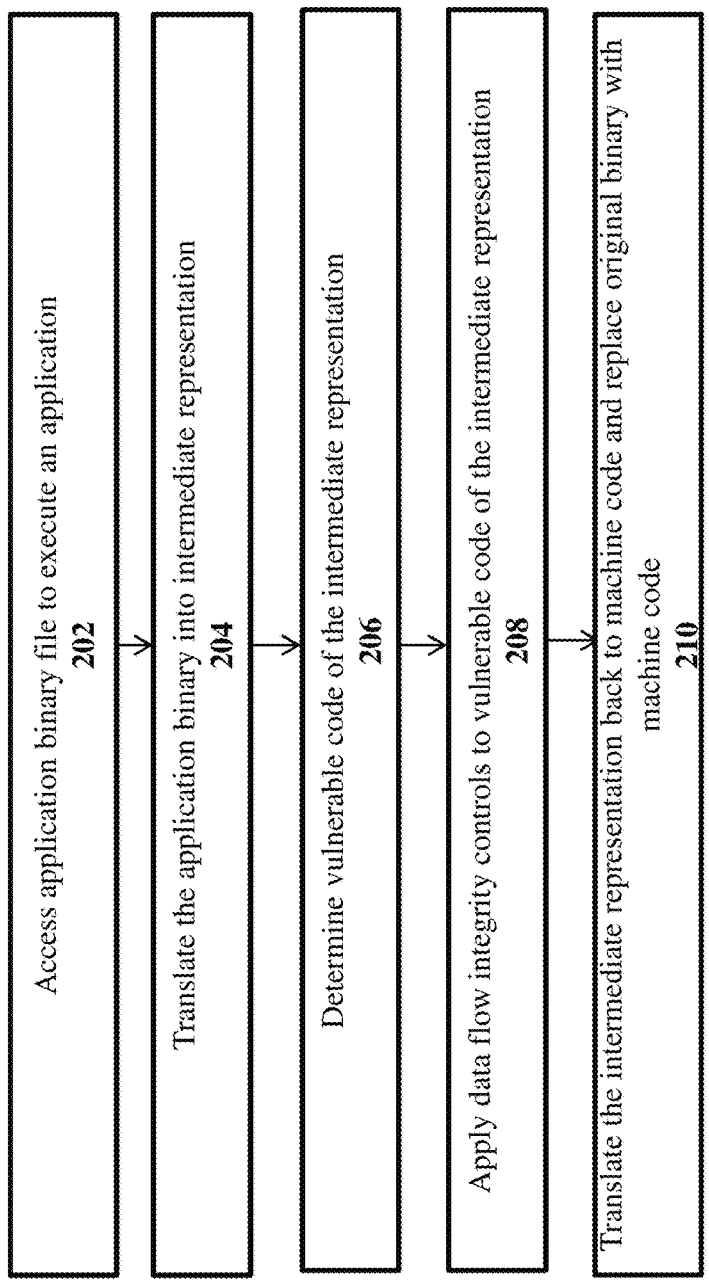
FIG. 2 illustrates a flowchart for runtime enforcement of data flow integrity, according to an embodiment.

FIG. 2 illustrates a flowchart 200 for improving the ranking and prioritization of attack-related events, according to an embodiment. Other embodiments may comprise additional or alternative steps, or may omit some steps altogether.

At step 202, the processor may access an application binary file to execute an application. A binary file is a file comprising application binary stored in binary format. A binary file is computer-readable but not human-readable. All executable programs are stored in binary files. The binary files may comprise the code of the programs. The processor may execute an application/program by executing the corresponding binary file. In some embodiments, the application binary file may be stored in a non-transitory storage medium, such as a disk. The processor may access such application binary file from the disk.

At step 204, the processor may translate the application binary into intermediate representation. The intermediate representation (IR) is the data structure or code used internally by a compiler or virtual machine to represent source code. An IR is designed to be conducive for further processing, such as optimization and translation. An IR must be accurate—capable of representing the source code without loss of information—and independent of any particular source or target language. An IR may take one of several forms: an in-memory data structure, or a special tuple- or stack-based code readable by the program. The intermediate instruction may comprise an intermediate graph structure that allows for data flow analysis and re-arrangement before creating a sequence of actual CPU instructions. Use of an intermediate representation allows compiler systems like the GNU Compiler Collection and LLVM (low level virtual machine) to be used by many different source languages to generate code for many different target architectures. Because the processor may translate the application binary, the methods disclosed herein are applicable even if the source code is not available.

In some embodiments, the processor may translate the application binary of the program into LLVM intermediate representation, which may be a higher-level description of the program/application structure. The processor may use different tools to work with the compilation to do the translation.

At step 206, the processor may determine a set of vulnerable code of the intermediate representation. As discussed above, the intermediate representation may allow for flow analysis. The processor may apply the logic of data flow integrity controls to the intermediate representation. The processor may first determine vulnerable code of the intermediate representation. The execution of an application may involve different operations of data records, such as read and write operations. Such operations may include non-control data attacks. For example, the application binary may include memory corruption, buffer overflow, and stack smashing vulnerability that can be exploited by attackers. While most conventional methods focus on only control-data attacks, such non-control data attacks may not be prevented. To combat the non-control data attacks, the processor may check the intermediate representation and identify the code vulnerable to the loss of data security, in terms of confidentiality and integrity. For example, the processor may identify the code for read and write instructions in the code section of the intermediate representation.

At step 208, the processor may apply data flow integrity controls to the vulnerable code of the intermediate representation. The processor may enforce data flow integrity by adding bookkeeping instrumentation to the read/write operations to protect the application binary from sophisticated memory corruption attacks. The processor may check the structure of data layout in memory, actively track the usage of the memory area (e.g., what memory areas are being used for what purposes) and make sure that every read and write operation is interacting only with the sections of memory that they are supposed to. If the operations may cause unauthorized data tampering (e.g., interacting with sections of memory not supposed to), the processor may take proper measures to stop the operations.

The processor may add simple instrumentation that only changes the application's behavior when unauthorized data tampering occurs while preserving the application's normal behavior. For example, for the read operation, the processor may check how much space is available to put the read data into. If the space is not enough and the read data may spill outside that space, the processor may correct the operation by either truncating the read data or killing the program. As a result, the process may guarantee that there is no security violation.

The processor may operate with minimal impact on performance. The processor may implement a method that has low overhead at the source level and does not drastically reduce the throughput. The processor may leverage existing binary analysis tools on COTS binaries to automatically insert instrumentation that enforces data flow integrity.

The processor may create a LLVM IR (intermediate representation) code analyzer by implementing a module that analyzes the reaching definition of an application's source code and the corresponding intermediate representation. The reaching definitions analysis is required for the enforcement of data flow integrity; every read instruction must verify the last writer of a memory location is contained in the corresponding reaching definitions set. In the embodiments disclosed herein, the method may use LLVM modular compiler backend.

LLVM may compile platform-agnostic intermediate representation (IR) code to machine code for specific CPU architectures. LLVM frontends compile code from specific high-level languages—for example, Clang compiles C/C++ code to IR. One advantage of operating on LLVM IR is that the LLVM may automatically support a variety of frontend languages including C/C++, Haskell, Fortran and Objective-C.

The LLVM IR language is a type of Static Single Assignment (SSA) representation. This property enables the processor to compute reaching definitions using LLVM-based analyses, such as MemorySSA, or other existing implementation. Reaching definitions is a data-flow analysis, which statically determines which definitions may reach a given point in the code. With reaching definitions in hand, a runtime will be able to enforce data flow integrity in applications compiled from IR.

The processor may implement a functional runtime at the LLVM IR level. The runtime may allocate a chunk of memory for the runtime definition table (RDT), which stores identifier of the last instruction to update a memory position. The processor may define the equivalent intrinsics for LLVM IR. The first intrinsic, SETDEF opnd id, sets the RDT entry for the operand to id. This is the instrumentation for write instructions. The second intrinsic, CHECKDEF opnd setName, verifies that the last writer of the operand is a member of the set of allowed writers.

The processor may implement a tool that statically rewrites an ELF file for x86-64 Linux machines and inserts the runtime. Essentially, this tool may replace the main function with the entry point of the runtime. The processor may also implement a version of the runtime for dynamically rewriting the code sections of a process. If necessary, the processor may leverage existing libraries for binary editing, such as the Binary Analysis Platform and Angr. These tools may enable the processor to lift the machine code to an intermediate representation for ease of analysis, modify the read/write instructions, and lower it back to machine code before writing it to the new shadow code section. In this stage, assuming the source code is available and the processor may use the LLVM IR analyzer to compute the set of reaching definitions. To prove the concept, this runtime will rewrite the original code sections to new positions in the address space and wipe out the original code sections.

At step 210, the processor may do the translation in reverse to translate the intermediate representation back to a machine code and replace the original binary with the machine code. The processor may update the binary file in the disk to replace the original code of application binary with the machine code. In some embodiments, the processor may rewrite the machine code to new positions in the address space of the disk and wipe out or delete the original code sections.

Figure 3:
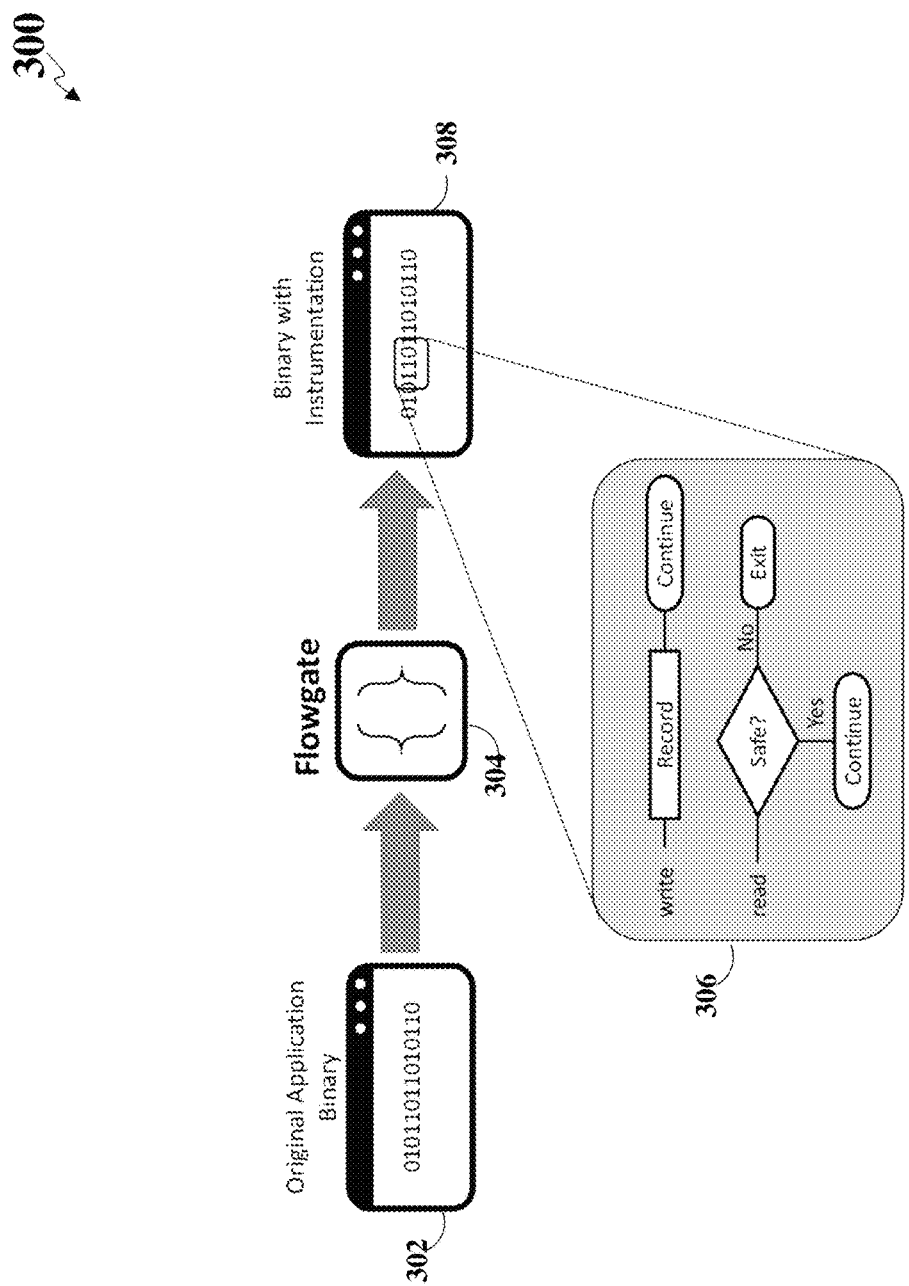
FIG. 3 illustrates a functional block diagram of runtime enforcement of data flow integrity, according to an embodiment.

FIG. 3 is a functional block diagram 300 illustrating runtime enforcement of data flow integrity, according to an embodiment. As shown in the figure, the processor executing a security application 304 may transform an existing application binary (e.g., original application binary) 302 by inserting instrumentation. The instrumentation may be the data flow integrity controls 306 that enforce data flow integrity by adding bookkeeping instrumentation to the read and write operations. More precisely, the processor may statically insert a runtime system into the file that will dynamically instrument all code sections when the application starts. After inserting the instrumentation, the processor may obtain the binary with instrumentation 308. The runtime may rewrite the original code sections as executable shadow code sections and wipe out the originals. The benefit of this technique is that all the code in the process is instrumented, including code loaded in from dynamic libraries.

Figure 4B:
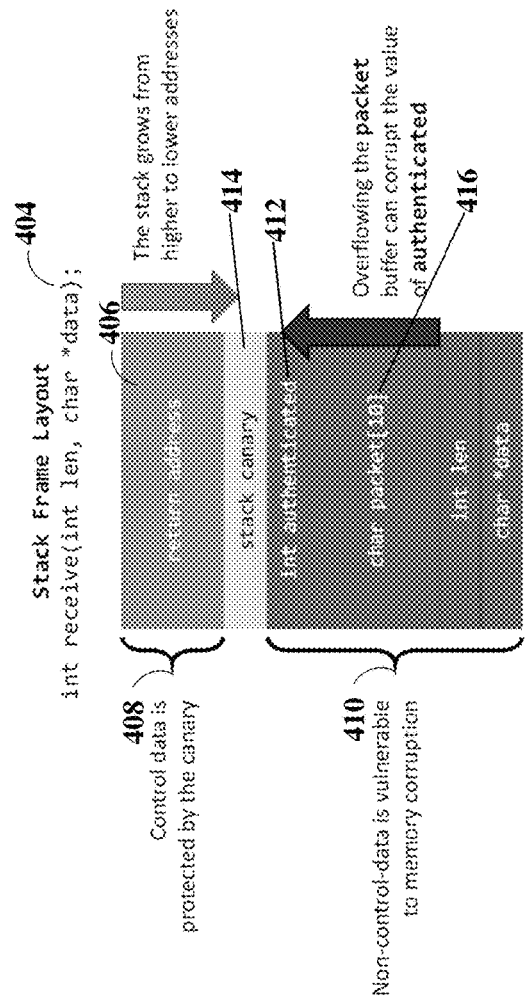
FIG. 4B illustrates an example of a simplified layout of a stack frame, according to an embodiment.

FIG. 4A illustrates a representative example of code 400a vulnerable to a non-control data exploit, according to an example. The code shown in the figure contains a buffer overflow vulnerability 402. FIG. 4B illustrates a simplified layout of a stack frame 400b produced by the receive( ) function 404. A typical control-data attack would likely exploit the buffer overflow to overwrite the return address 406, seen at the top of the diagram. Sophisticated attackers may take this and run, using advanced code reuse techniques to make existing code do their bidding. To prevent these types of stack smashing attacks, C/C++ compliers may use stack canaries.

The major failing of stack canaries and related techniques, is that they focus on protecting only the control data 408, and leave the non-control data 410 vulnerable. In the code example, the attacker can provide a data array for "packet" 416 consisting of all ones, which is long enough to overwrite authenticated 412, but short enough to leave the stack canary 414 unchanged. The effect is that the unauthorized user has bypassed the intended method of authentication.

Data flow integrity enforcement instruments all read and write instructions in the binary. Every write operation updates a record table with the current program counter. Each read operation verifies that the last instruction to modify the target address was a member of the statically computed data flow graph. This graph is simple enough to compute when operating directly on source code, but some of this semantic context is lost when compiling to machine code. The processor may construct the data flow graph from the application binary in a preliminary analysis step, using a method of constructing precise control flow graphs. In this technique, the binary is executed in a controlled virtual environment. Every time control reaches a branch point, the path not taken is saved for later exploration. In this way, it resembles a depth-first search through possible code paths. Once the processor has reconstructed the control flow graph, the data flow graph can be computed fully automatically.

The processor may provide a solution to the need to protect security-relevant data residing in application memory from exfiltration. Its design is especially convenient because it operates directly on COTS binaries without requiring source code. Additionally, the processor operates on the application's process in its entirety, including all dynamically-linked libraries. The method disclosed herein is not tied to a specific operating system and does not have high performance penalties.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   accessing, by a processor, an application binary of a binary file corresponding to an application from a non-transitory storage medium;
   translating, by the processor, the application binary of the binary file into intermediate representation, wherein the intermediate representation comprises an intermediate graph structure for data flow analysis, the intermediate graph structure constructed by executing the application binary in a controlled virtual environment;
   applying, by the processor, data flow integrity control logic to a set of code within the intermediate representation by checking structure of data layout in memory and tracking usage of memory area for an unauthorized data tampering behavior;
   adding, by the processor, to the set of code an instrumentation configured to correct the unauthorized data tampering behavior; and
   translating, by the processor, the intermediate representation with the added instrumentation into a machine code.

2. The method of claim 1, wherein the unauthorized data tampering behavior is a non-control data attack comprising at least of loss of data security, memory corruption, buffer overflow, and stack smashing.

3. The method of claim 1, wherein the set of code comprises code for read and write instructions in the intermediate representation.

4. The method of claim 1, further comprising:
applying, by the processor, the data flow integrity controls by analyzing a reaching definition of the intermediate representation.

5. The method of claim 1, wherein the instrumentation comprises changing the unauthorized data tampering behavior while preserving normal behavior.

6. The method of claim 1, wherein the instrumentation comprises killing the application.

7. The method of claim 1, further comprising:
adding, by the processor, instrumentation to the set of code by implementing a functional runtime for write instructions to verify the last writer of a operand is a member of a set of allowed writers.

8. The method of claim 1, further comprising:
replacing, by the processor, the application binary of the binary file with the machine code by rewriting the machine code to a new position in the non-transitory storage medium and deleting the application binary.

9. The method of claim 1, wherein the intermediate representation is low level virtual machine (LLVM) intermediate representation.

10. The method of claim 1, wherein the processor enforces the data flow integrity controls in runtime.

11. A system comprising:
a non-transitory storage medium configured to store a binary file corresponding to an application;
a processor connected to the non-transitory storage medium and configured to:
access application binary of the binary file from the non-transitory storage medium;
translate the application binary of the binary file into intermediate representation, wherein the intermediate representation comprises an intermediate graph structure for data flow analysis, the intermediate graph structure constructed by executing the application binary in a controlled virtual environment;
apply data flow integrity control logic to a set of code within the intermediate representation by checking structure of data layout in memory, tracking usage of memory area for unauthorized data tampering behavior;
add to the set of code an instrumentation configured to correct the unauthorized data tampering behavior; and
translate the intermediate representation with the added instrumentation into a machine code.

12. The system of claim 11, wherein the unauthorized data tampering behavior is a non-control data attack comprising at least one of loss of data security, memory corruption, buffer overflow, and stack smashing.

13. The system of claim 11, wherein the set of code comprises code for read and write instructions in the intermediate representation.

14. The system of claim 11, wherein the processor is further configured to:
apply the data flow integrity controls by analyzing reaching definition of the intermediate representation.

15. The system of claim 11, wherein the instrumentation comprises changing the unauthorized data tampering behavior while preserving normal behavior.

16. The system of claim 11, wherein the instrumentation comprises killing the application.

17. The system of claim 11, wherein the processor is further configured to:
adding, by the processor, instrumentation to the set of code by implementing a functional runtime for write instructions to verify the last writer of a operand is a member of a set of allowed writers.

18. The system of claim 11, wherein the processor is further configured to:
replace the application binary of the binary file with the machine code by rewriting the machine code to a new position in the non-transitory storage medium and deleting the application binary.

19. The system of claim 11, wherein the intermediate representation is low level virtual machine (LLVM) intermediate representation.

20. The system of claim 11, wherein the processor enforces the data flow integrity controls in runtime.

* * * * *